G. WILLARD.
Apparatus for Making Ice.

No. 137,523.

Patented April 1, 1873.

Witnesses:
Jn. D. Patten
D. T. Cowl

Inventor:
Gardner Willard

UNITED STATES PATENT OFFICE.

GARDNER WILLARD, OF NEW YORK, N. Y.

IMPROVEMENT IN APPARATUS FOR MAKING ICE.

Specification forming part of Letters Patent No. 137,523, dated April 1, 1873; application filed March 20, 1873.

*To all whom it may concern:*

Be it known that I, GARDNER WILLARD, of the city, county, and State of New York, have made a new and useful Improvement in Domestic Ice-Making Apparatus for the use of families residing in warm latitudes, those remote from supplies of natural ice, and expedition parties, of which the following is a specification:

The nature of my improvement consists of an arrangement of rectangular metal boxes for holding water, inclosed in a chamber lined with a good non-conductor of heat, and having in the center and in contact with them a cistern for holding a salt, which in dissolving produces a degree of cold which freezes the water, the whole so adjusted and arranged that the boxes of ice may be removed and the blocks placed together and formed into one large and solid mass; and, further, in the mode of removing the freezing-mixture, and the separation of its ingredients by simple distillation for repeated uses, the whole providing a compact, simple, and inexpensive apparatus.

In order that my improvement may be understood, manufactured, and operated by others, I will describe its structure and the details of working it. To do this I will refer to the accompanying drawing.

Figure 1:
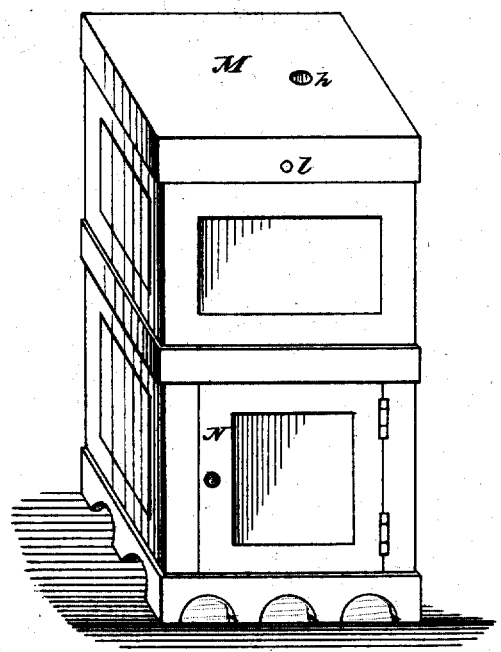
Figure 2:
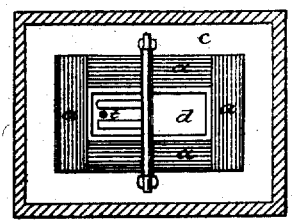
Figure 3:
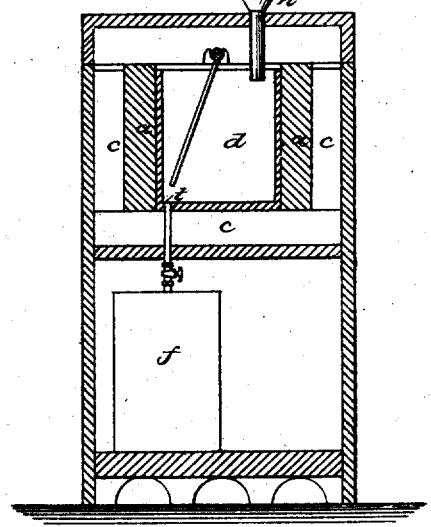

Figure 1 is a perspective of the apparatus. Fig. 2 is a plan view of the interior of the case when the lid is removed. Fig. 3 is a side section of the whole.

The exterior case is of wood, thirty inches high, seventeen by thirteen inches square. The top or lid M opens on hinges. $c$, Figs. 2 and 3, represents the outer lining of the case, which is two inches thick, and a good non-conductor of heat. I prefer dry paper-pulp. This is lined with sheet-zinc so as to form an inner chamber seven and a half inches wide, eleven and a half inches long, and nine inches deep. Within this chamber are arranged four rectangular boxes, as shown in the figure, $a\ a\ a\ a$. These are nine inches deep, and two inches by seven and a half inches at their sides, each having a lid, and made of copper plated with nickel. Closely fitting between these boxes is a copper box, $d$, nine inches deep, three and a half inches wide, and seven and a half inches long. This box is open at the top, and forms a central cistern of the whole. The lid M, Fig. 1, which covers the boxes above described, is lined with dry paper-pulp and a sheet of zinc, the same as the side walls, but has an addition of covering over the zinc of first flannel and next rubber sheeting. Through the lid and its lining passes a copper tube, $h$, to which a funnel may be attached, and liquid and salts poured into the cistern without exposing the interior to the air. When not in use the funnel is removed and the tube closed with a rubber stopper. At the bottom of the cistern is an orifice, $t$, from which a copper tube leads to a lower apartment. A stop-cock is attached to this tube, through which the contents of the cisterns are drawn into a receptacle placed to receive them. At the upper edges of the cistern are riveted two copper ears having holes in them to receive a copper journal, as shown at $l$, Fig. 2. To the journal is attached a slip of perforated sheet-copper, which reaches near the bottom of the cistern, and serves to agitate the mixtures in it. One end of the journal is square, and reaches to the zinc lining. Opposite this end is an aperture through the box $l$. A key in the form of a crank is inserted through the aperture, and works the journal and stirrer, above described.

In using the apparatus the boxes $a\ a\ a\ a$ are filled with cold water and their covers adjusted. The lid is then closed and fastened, the funnel attached to the tube $h$, and four pounds of granulated crystals of sulphate of soda (Glauber's salt) are passed into the cistern $d$; then two and a half pounds by measure of hydrochloric acid are added, the funnel is removed, the tube closed with the rubber stopper. The key-crank is next attached through the orifice $l$ to the journal of the mixer, and the mixture agitated occasionally during ten minutes to assist the solution of the salts in the acid. At the expiration of this time the cock in the lower apartment is opened, and the solution allowed to fall into the receptacle placed there to receive it. The cistern is again charged, as before, with salt and acid. These charges are repeated during about one hour, and will require about sixteen pounds of the sulphate of soda, twelve pounds of hydrochloric acid. The cover of the case is next opened, and the boxes $a\ a\ a\ a$, which now contain ice, are removed. The warmth of the atmosphere will soon render the blocks of ice within them in a condition by which they may be dropped out by their own gravity. Each cake is placed on another as it is removed from the case, and the whole congeal together, forming a solid block, which is placed in a refrigerator or wrapped in a woolen blanket for use. The quantity of ice thus formed is about sixteen pounds.

Figure 4:
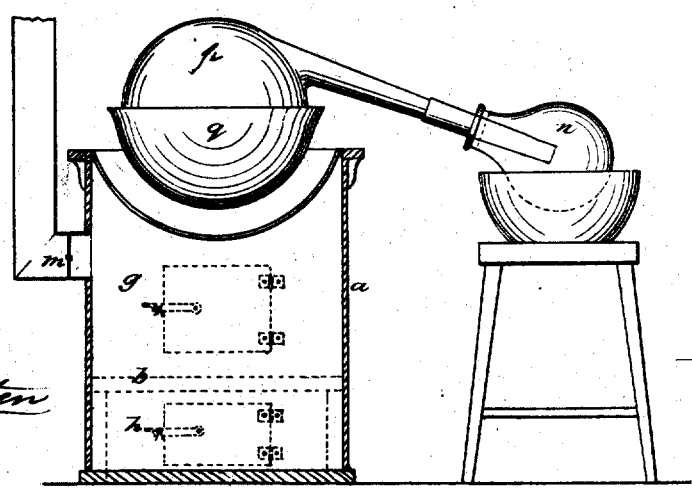

In order to separate the acid from the salt for reuse, a separate apparatus is employed. This is shown in Fig. 4.

$a$ is an iron cylinder heater, twenty-one inches high, fifteen inches diameter, having a grate, $b$, a fire-space for wood, $g$, and ash-box $h$. On one side of the cylinder is attached a short smoke-pipe, $m$. At the top is a sand-bath, $q$. A porcelain retort, $p$, rests in the sand-bath. This is made in sections so that the upper part serves the purpose of an alembic heat to a still. A short neck leads from the upper or cap part of the retort, to which is attached a glass tube leading into a glass flask, $n$, which rests in a receptacle of cold water. The solution of sulphate of soda in the hydrochloric acid, which was employed to freeze the ice, as above described, is placed in this retort, and when the cap and condenser have been adjusted, a wood fire is made in the heater, the acid distilled over at little above 230° Fahrenheit, and condenses in the flask $n$, which should be kept cool. When all the acid has distilled over the cap of the retort is taken off, and the sulphate of soda removed.

Having thus described my improvement, what I claim as of my invention, and desire to secure by Letters Patent, is—

1. The improved apparatus for forming ice, consisting of a wooden case divided into two compartments, the upper lined with a good non-conductor of heat for insulating the freezing-boxes, and the lower for holding the liquid solution, as set forth.

2. The method described for forming blocks of ice by means of movable boxes arranged in an insulated chamber at the sides and around a cistern containing a freezing-mixture, substantially as described.

3. The entire apparatus, consisting of the freezing-vessel $d$ with boxes $a\ a\ a\ a$ and vessel $f$, all arranged as described, for the purpose set forth.

GARDNER WILLARD.

Witnesses:
WM. M. FINCKE,
CHARLES MARTIN.